United States Patent [19]

Zechnall et al.

[11] 4,109,616

[45] * Aug. 29, 1978

[54] INJECTION CONTROL SYSTEM FOR AN INTERNAL COMBUSTION ENGINE

[75] Inventors: Richard Zechnall; Günther Baumann, both of Stuttgart, Germany

[73] Assignee: Robert Bosch GmbH, Stuttgart, Germany

[*] Notice: The portion of the term of this patent subsequent to Nov. 9, 1993, has been disclaimed.

[21] Appl. No.: 740,050

[22] Filed: Nov. 8, 1976

Related U.S. Application Data

[63] Continuation of Ser. No. 29,348, Apr. 2, 1970, Pat. No. 3,990,412.

[30] Foreign Application Priority Data

Apr. 4, 1969 [DE] Fed. Rep. of Germany ....... 1917487

[51] Int. Cl.² ............................................... F02B 3/00
[52] U.S. Cl. .............................. 123/32 EA; 123/117 R
[58] Field of Search ........................ 123/32 EA, 117 R

[56] References Cited

U.S. PATENT DOCUMENTS

| | | | |
|---|---|---|---|
| 3,853,103 | 12/1974 | Wahl et al. | 123/117 R |
| 3,990,412 | 11/1976 | Zechnall et al. | 123/32 EA |

*Primary Examiner*—Charles J. Myhre
*Assistant Examiner*—R. A. Nelli
*Attorney, Agent, or Firm*—Michael J. Striker

[57] ABSTRACT

Injected into an internal combustion engine are fed pulses via a gate which starts to transmit when the crank shank of the engine is in a particular angular position and stops the transmission when the number of pulses applied to the injectors is equal to a number determined as a function of various operating parameters of the engine. The injectors remain open while pulses are being applied and close when the gate closes.

6 Claims, 2 Drawing Figures

INJECTION CONTROL SYSTEM FOR AN INTERNAL COMBUSTION ENGINE

This is a continuation of application Ser. No. 29,348, filed Apr. 2, 1970, now U.S. Pat. No. 3,990,412.

BACKGROUND OF THE INVENTION

This invention relates to an arrangement for controlling the quantity of fuel injected during each injection cycle of an internal combustion engine. It is desired that the quantity of fuel injected for cycle be the optimum based upon the operating parameters of the engine. In the systems here under consideration, the quantity of fuel is a function of the injection time during which the injection means of the internal combustion engine are open.

The exhaust of an internal combustion engine which has an injection arrangement instead of a carburetor can be substantially free of products of incomplete combustion if the amount of fuel injected during each cycle corresponds to the current operating conditions of the engine.

Electronically controlled systems for controlling the amount of fuel injected during each operation cycle comprise electromagnetically operated injectors to which fuel is furnished under constant pressure, so that the quantity of fuel depends directly upon the time that the injectors are open.

In conventional injection systems, the main timing element is monostable multivibrator whose unstable condition controls the injection time, or, the time the injectors are open. The time which the monostable multivibrator remains in the unstable state, is determined by the operating parameters of the engine. However, changes in the electrical parameters of the components constituting the monostable multivibrator circuit can also affect time in which the monostable multivibrator remains in the unstable state, so that errors in the injection time are introduced due to aging of components, replacement of one component by another with slightly different electrical characteristics, etc.

SUMMARY OF THE INVENTION

It is an object of the present invention to furnish a control system for controlling the quantity of fuel injected in each injection cycle of an internal combustion engine which does not have the above-mentioned disadvantages.

This invention is a control system for controlling the quantity of fuel injected by injection means in an internal combustion engine during each operating cycle. It comprises means for furnishing a first signal signifying the desired injection time as a function of the operating parameters of the engine. It further comprises means for furnishing a second signal, said second signal signifying at any time instant during an injection the total injection time up to said time instant and furnishing a terminating signal when said second signal has a predetermined relationship to said first signal. Further, means are furnished for terminating the injection by closing the injection means upon receipt of said terminating signal.

The control system in accordance with this invention may be either of the analog or the digital type. It is the advantage of digital processing that the control system would be substantially immuned to error introduced by outside noise signals. In any at least partially digital embodiment of the present invention, a series of pulses constituting operating pulses is applied to the injection means for the purpose of opening said injection means. A counter may then be furnished for counting the operating pulses, the count on said counting means thus constituting a second signal. In a preferred embodiment of the present invention, the counter may be a forward-reverse counter which is preset between injections to a number corresponding to the desired injection time. The operating pulses are then applied to the reverse counting input of the counter and the terminating signal is generated by the counter when it reaches its zero condition. The terminating signal may be applied to the blocking input of gating means which transmit pulses furnished a pulse generating means when in a conductive state and block said pulses when in a non-conducting state. If the output of the gating means constitute the operating pulses, it is obvious that the time that the gate is in the conductive condition has a fixed relationship to the time that the injection means are open, namely the injection time. The gating means may be put into the conductive condition by means of a start signal applied to the first input of said gating means. The start signal may, for example, be a start pulse generated when a rotating member of the internal combustion engine is in a predetermined angular position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
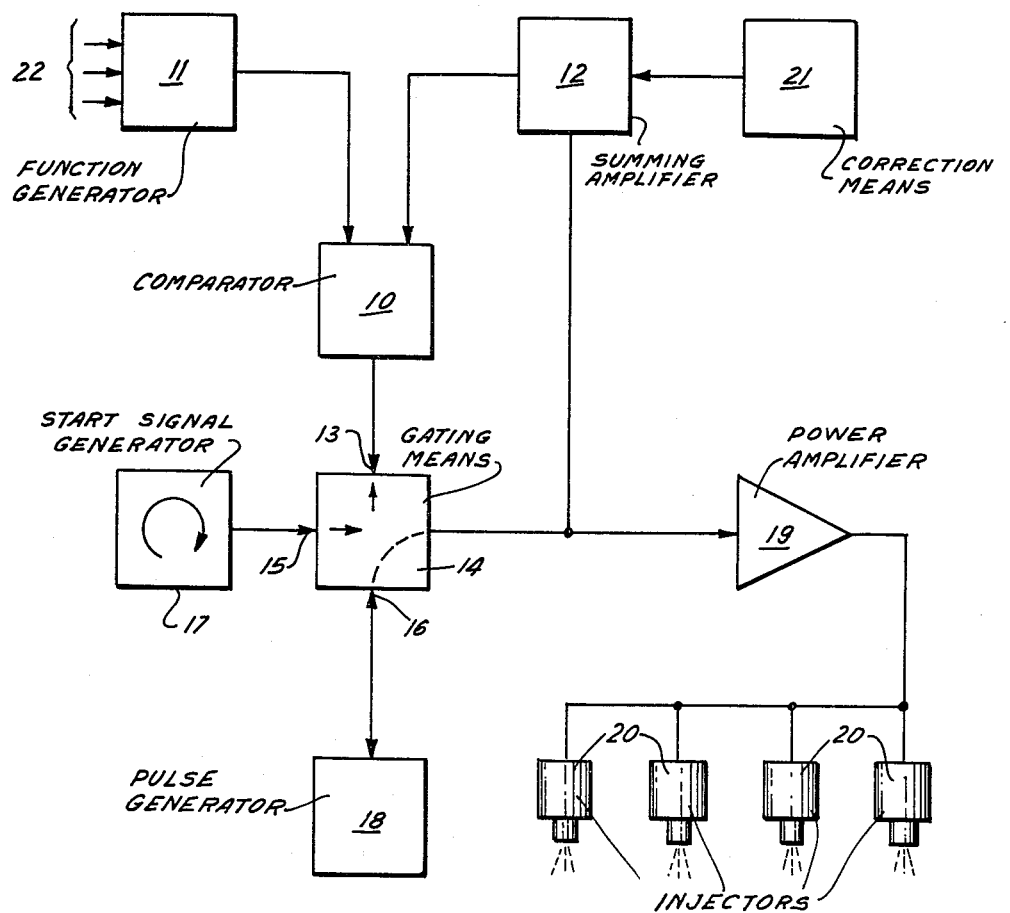
FIG. 1 is a block diagram of an arrangement in accordance with this invention.

A preferred embodiment of the present invention will now be discussed with reference to the drawing.

In FIG. 1, reference numeral 11 designates the means for furnishing a first signal signifying the desired injection time. This means may be a function generator which has an output varying as a function of selected operating parameters of the engine in accordance with which the injection time is to be varied. Such operating parameters may, for example, be the motor speed, the operating temperature, the position of the accelerator, etc. A simplified embodiment of a function generator which furnishes an electrical signal as a function of such parameters, may be found in German Patent 1,256,489. Such function generators are, of course, also known in analog computer technique and may, for example, comprise operational amplifiers.

Means for furnishing a second signal signifying at any time instant during an injection, the total injection time up to said time instant and furnishing a terminating signal when said second signal has a predetermined relationship to said first signal, are pictured in FIG. 1 as blocks 10 and 12. Specifically, block 12 has an output connected to one input of block 10, while the other input of block 10 is connected to the output of block 11. The output of block 10 is connected to an input 13, the second input, of gating means 14 whose first input (reference numeral 15, FIG. 1) is connected to means for furnishing a start signal, labeled block 17 in FIG. 1. Means for furnishing a start signal as a function of the angular position of a rotating member of the internal combustion engine may, for example, comprise a disc mounted on such a rotating member, said disc having a marking or other means in a fixed position thereon which, when passing a stationary cooperating member generates a signal either mechanically, optically, or magnetically. Such arrangements are well known in the art and will not be further discussed here. Gating means 14, have a further input 16 to which is connected the output of pulse generating means, here an astable multivibrator labeled 18. As indicated by the dashed lines within the gating means 14 when the gate is in the conductive condition, the pulses from the astable multivibrator are furnished both to one input of block 12 and one input of block 19 which is a power amplifier. The output of power amplifier 19 is connected to injection means, here four injectors labeled 20. The connections shown in FIG. 1 indicate that the four injectors are operated simultaneously. It is of course possible to operate each injector individually without exceeding the scope of the present invention. A block 21 having an output connected to a second input of block 12, constitutes additional correction means which may operate upon the circuitry contained in block 12 in dependence upon other relevant operating conditions of the engine.

Figure 2:
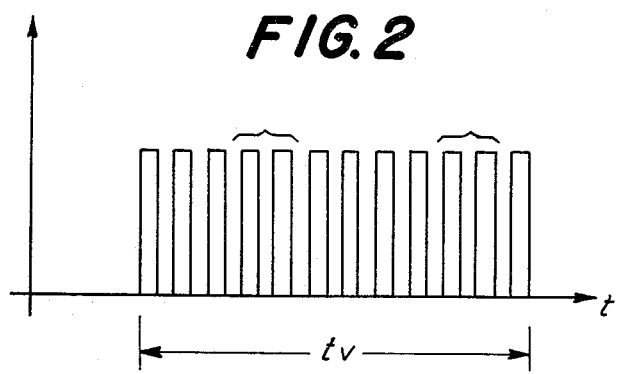
FIG. 2 shows a sequence of operating pulses as furnished by the arrangement of FIG. 1.

FIG. 2 shows the pulse sequence appearing within a time $t_v$ corresponding to the injection time during one cycle at the output of gating means 14.

The arrangement shown in FIG. 1 operates as follows:

Astable multivibrator 18 oscillates continually at a constant frequency. As mentioned above, the dashed lines within gating means 14 indicate that these pulses are transmitted to the input of amplifier 19 when the gate is in the conductive state. Amplifier 19 here acts merely as a power amplifier without causing any substantial change in the shape of the pulses. The operating pulses applied to injectors 20 are shown in FIG. 2. The injectors are constructed in such a manner that they remain open throughout the whole pulse sequence. They remain open because of the inductivity of their operating windings and the inertia of the moving parts of the injectors. However, if a number of pulses are suppressed within the pulse sequence, as indicated by the brackets in FIG. 2, the injectors close at least partially during the time period in which the pulses are removed. Blocking of pulses during the injection time, may be accomplished, for example, by interposing an OR gate between block 10 and block 14 of FIG. 1, connecting the output of block 10 to one input of the OR gate and a signal to the second input of the OR gate by which it is desired to effect the pulse suppression. Connecting the output of the OR gate to the input 13 of gating means 14, will then effect the desired pulse suppression.

When gating means 14 receive a start signal at input 15, the gating means are switched to the conductive state as indicated by the arrow in FIG. 1. Input 15 is thus connected with the means for furnishing a start signal which have been described above. A start signal is thus furnished whenever the rotating member of the internal combustion engine is at a predetermined angular position. It is of course possible to change the angle at which the start signal is furnished in dependence upon a pertinent operating parameter of the engine. The means for changing the angle are not indicated in the Figure, but may, for example, constitute variable delay means operating upon the start signal furnished as discussed above.

As long as gate 14 is in the conductive state, the pulses from astable multivibrator 18 are conducted to the input of block 12. The reason that blocks 12 and 10 were combined into a single means for furnishing a second signal, is that in a digital embodiment the two functions are combined in a forward-reverse counter as discussed above. In the partially analog embodiment shown here, block 12 comprises a summing amplifier at whose output is furnished a second signal corresponding to the sum of pulses received at the input. Such a summing amplifier is well known in the art and may, for example, be an operational amplifier with a capacitor in the feedback path. In the embodiment of FIG. 1, the output of the summing amplifier 12 is applied to a comparator 10, one embodiment of comparing means. The second input of the comparing means is connected to the output of the function generator 11. Comparator 10 generates the terminating signal when the signals at both of its inputs are equal. The terminating signal is then applied to input 13 of gate 14. As indicated by the arrow, the gate is switched to the blocking state upon application of a signal to input 13. During each injection cycle, the comparator 10 thus compares the first signal which corresponds to the desired injection time with the output of summing amplifier 12 which corresponds to the actual injection time. Gate 14 is then blocked by means of the output of the comparator 10 when the desired injection time and the actual injection time are equal. Blocking of gate 14 of course blocks the transmission of operating pulses to the injectors and thus causes the closing of said injectors. The quantity of fuel injected during a cycle is thus not, in this embodiment, fixed when the start signal is furnished, but is computed by an integrated type of process during the actual injection time.

If function generator 11 is insufficient for taking into consideration all the pertinent parameters of the engine, then additional correction means (block 21, FIG. 1) may be added to the circuit whose output may influence the operation of the summing amplifier 12.

Further possibilities for altering the circuit operation as a function of operating parameters are changing the frequency at which oscillator 18 operates. Of course, oscillator 18 is not restricted to an astable multivibrator, whose frequency may not be sufficiently constant for all applications. For more accurate work other types of oscillators may of course be used.

The arrangement of this invention is in no way restricted to injectors using gasoline. Other types of magnetic injection valves may be used for Diesel engines in order to overcome the higher counter pressures inherent in the direct injection of fuel. For proper combustion in a Diesel engine, it is preferable that the amount of fuel injected per unit time, also be made variable. This may be accomplished by use of an OR gate as discussed above and will cause the blocking of several pulses as indicated in FIG. 2. This causes the injectors to close completely or in part, thus causing the amount of fuel per unit time to vary within each injection interval.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an internal combustion engine having injection means, an arrangement for controlling the quantity of fuel injected by controlling the length of injection time of each injection, comprising, in combination, first signal furnishing means furnishing, as a function of at least one operating parameter of said internal combustion engine, a first signal signifying the desired injection time; means furnishing a start signal for starting an injection; control means responsive to said start signal for furnishing an opening signal to said injection means, said opening signal maintaining said injection means open during application of said opening signal; means connected to said control means for deriving from said opening signal a second signal having at any instant a value dependent upon the duration of said opening signal up to that instant; comparator means receiving said first and second signals and furnishing a terminating signal when said second signal has achieved a predetermined relationship to said first signal; and means for terminating said injection upon generation of said terminating signal.

2. An arrangement as defined in claim 1, wherein said means for deriving said second signal from said opening signal comprises integrating means for deriving said second signal from said opening signal in dependence upon the time integral of said opening signal.

3. An arrangement as defined in claim 1, the internal combustion engine including a rotary component, wherein said means furnishing said start signal comprises means operative for furnishing said start signal when said rotary component of the internal combustion engine assumes a predetermined angular position.

4. An arrangement as defined in claim 1, further including correcting means connected to said means for deriving said second signal and operative for varying the dependence of said second signal upon said opening signal in dependence upon at least one operating parameter of the internal combustion engine.

5. An arrangement as defined in claim 1, the injection means having an electrical input, said control means furnishing said opening signal to said electrical input of said injection means, said means for deriving said second signal from said opening signal having an electrical input connected to said electrical input of said injection means and receiving said opening signal therefrom.

6. In an internal combustion engine having injection means, an arrangement for controlling the quantity of fuel injected by controlling the length of injection time of each injection, comprising, in combination, first signal furnishing means for furnishing, as a function of at least one operating parameter of said internal combustion engine, a first signal signifying the desired injection time; means for furnishing a second signal signifying at each time instant during an injection the total injection time up to said time instant; and comparator means receiving said first and second signals and operative for terminating said injection when said second signal has a predetermined relationship to said first signal.

* * * * *